(12) United States Patent
Matson et al.

(10) Patent No.: US 9,610,816 B2
(45) Date of Patent: Apr. 4, 2017

(54) BUOYANT ICE TRANSPORT VEHICLE

(71) Applicants: Kirk J. Matson, Lebanon, CT (US);
Isolde Lise Matson, Canton, PA (US)

(72) Inventors: Kirk J. Matson, Lebanon, CT (US);
James P. Matson

( * ) Notice: Subject to any disclaimer, the term of this patent is extended or adjusted under 35 U.S.C. 154(b) by 221 days.

(21) Appl. No.: 14/266,449

(22) Filed: Apr. 30, 2014

(65) Prior Publication Data
US 2014/0329423 A1 Nov. 6, 2014

Related U.S. Application Data

(60) Provisional application No. 61/819,876, filed on May 6, 2013.

(51) Int. Cl.
*B62M 27/02* (2006.01)
*B60F 3/00* (2006.01)
*A01K 97/01* (2006.01)

(52) U.S. Cl.
CPC ............ *B60F 3/0076* (2013.01); *A01K 97/01* (2013.01); *B60F 3/0007* (2013.01); *B60F 3/0069* (2013.01); *B62M 27/02* (2013.01)

(58) Field of Classification Search
CPC ..................................................... B62M 27/02
See application file for complete search history.

(56) References Cited

U.S. PATENT DOCUMENTS

| | | | | |
|---|---|---|---|---|
| 1,048,337 A | * | 12/1912 | Offenburger | B62B 15/001 114/43 |
| 2,866,985 A | * | 1/1959 | Blackmore | B63B 3/00 114/357 |
| 3,124,096 A | * | 3/1964 | Graig | B63B 1/22 114/126 |
| 3,139,057 A | * | 6/1964 | Black | B63B 7/085 114/43 |
| 3,190,255 A | | 6/1965 | Olson | |
| 3,489,423 A | * | 1/1970 | Easton | B62B 13/08 114/43 |
| 3,669,201 A | * | 6/1972 | Taylor | B62M 27/02 180/196 |
| 4,109,739 A | | 8/1978 | Husted | |
| 5,330,014 A | | 7/1994 | Wagner | |
| 6,267,190 B1 | | 7/2001 | Micheletti | |
| 6,595,812 B1 | | 7/2003 | Haney | |

(Continued)

OTHER PUBLICATIONS

ARGO 6×6 650 HD 6-wheel drive amphibious off-road vehicle, available at http://argoatv.com/products/6x6-650-hd.

(Continued)

*Primary Examiner* — Edwin Swinehart
(74) *Attorney, Agent, or Firm* — UConn IP Law Clinic; Zhongyu Wang; Raymond Withers-Tong

(57) ABSTRACT

A collapsible, inexpensive and lightweight vehicle powered by an engine for movement over frozen bodies of water. In one embodiment, an internal combustion engine, a kayak and a drive system assembly comprising detachable studded wheels is detachably connected to a collapsible chassis. The vehicle provides transport across frozen bodies of water and the kayak provides buoyancy sufficient to support the vehicle and a passenger should the ice collapse underneath the vehicle. The vehicle thus provides fast, convenient and safe transport across frozen bodies of water.

20 Claims, 8 Drawing Sheets

(56) References Cited

U.S. PATENT DOCUMENTS 7,329,161 B2 2/2008 Roering
2007/0209837 A1 9/2007 Gancarz

OTHER PUBLICATIONS

SNOBEAR recreational vehicle, available at http://www.snobear.org/public_html/.
The Wilcraft ice fishing rig, available at http://thewilcraft.com/index.php?option=com_content&view=article&id=37&Itemid=202.

* cited by examiner

BUOYANT ICE TRANSPORT VEHICLE

CROSS-REFERENCE TO RELATED APPLICATIONS

This application claims priority to U.S. Provisional Application No. 61/819,876 filed on May 6, 2013 which is incorporated herein by reference in its entirety.

BACKGROUND OF THE INVENTION

The present invention is generally directed to buoyant vehicles for transport over frozen bodies of water.

Every year many people travel across frozen bodies of water. In particular, many sports, including ice fishing, require extensive travel over frozen bodies of water. Travel across the frozen bodies of water is risky because of the grave risk of falling through the ice into the freezing water. This risk is exacerbated during the early and late portions of the season when the ice is at its thinnest.

Oftentimes, people use snowmobiles as a means of transport across frozen bodies of water. However, snowmobiles are large, expensive and heavy. In addition, the additional weight from snowmobiles can further increase the risk of collapse and the snowmobiles provide no safety when the ice collapses. Furthermore, snowmobiles often require another vehicle with a towing means to transport the snowmobile to the desired launching location.

Prior attempts to solve the problem of safe travel across frozen bodies of water often resulted in inconvenient, expensive and complicated vehicles. Thus, individuals must choose between using a snowmobile and take the chance of falling though the ice or purchase an expensive and unwieldy vehicle that mitigates the risk of collapsing ice. Furthermore, another vehicle equipped with a towing means is often required to transport the vehicle to a launching point.

From the above, it is therefore seen that there exists a need in the art to overcome the deficiencies and limitations described herein and above.

SUMMARY OF THE INVENTION

The shortcomings of the prior art are overcome and additional advantages are provided through an inexpensive, lightweight and collapsible vehicle that satisfies these needs of inexpensive and convenient but safe transport across frozen bodies of water. A vehicle having features of the present invention comprises a collapsible chassis, a floatation device, a buoyant housing device, an engine, a drive system assembly, and a running gear selection. The running gear selection further consists from the group of: at least one wheel and axle, a track system or a screw system. The collapsible chassis further comprises a system for attaching the floatation device, the engine, and a drive system assembly. The floatation device provides sufficient buoyancy so that the buoyant device floatably supports the vehicle and a passenger in a body of water. The engine also provides sufficient power to the drive system to propel the vehicle when the drive system is engaged to drive the vehicle across a solid surface. For the purposes of discussion, water hereinafter refers to liquid water, as opposed to solid water, which is hereinafter referred to as ice.

In one embodiment of the invention, the engine comprises an ice auger motor that detachably connects to a drive system assembly. The drive system assembly is dimensioned and configured to drive the drive wheels which propel the vehicle along a solid surface.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 9 is a front view of the center steering ski and the skeg.

DETAILED DESCRIPTION

Figure 1:
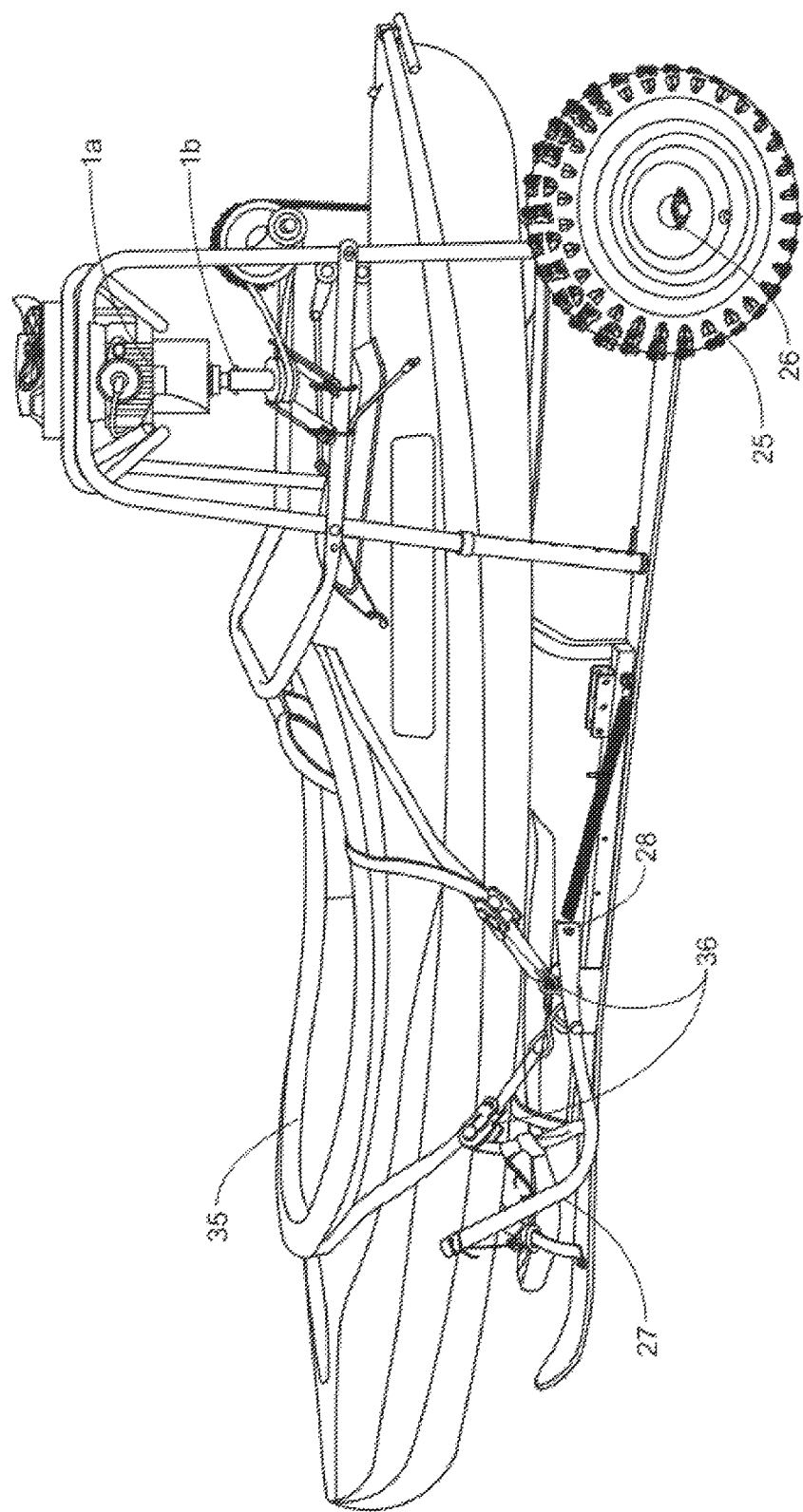
FIG. 1 is a side view of one embodiment of the invention with a kayak, ice auger motor engine, and wheels attached to the collapsible chassis.
Figure 2:
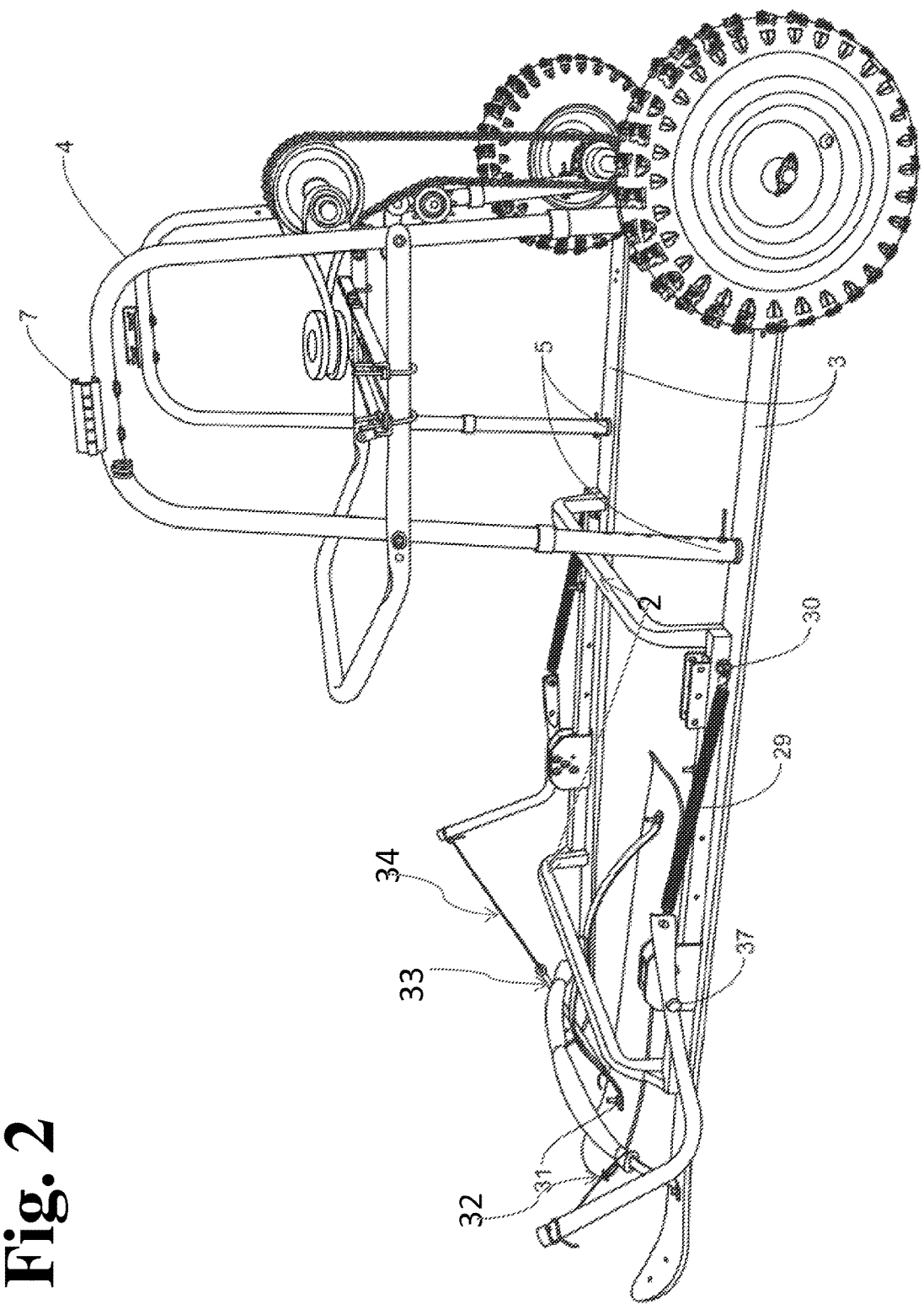
FIG. 2 is a side view of the collapsible chassis of one embodiment of the invention.

As shown in FIGS. 1 and 2, one embodiment of a buoyant ice transport vehicle comprises a collapsible chassis 4 configured to receive the following: a detachable buoyant device comprising a kayak 35, a detachable engine comprising the engine from an ice auger 1a, and a detachable drive means comprising studded rear wheels 25 mounted on an drive axle 21, two skis 3 and a center steering ski 31.

As best seen in FIG. 2, the chassis 2 of this vehicle is preferably fabricated from a light weight metal such as aluminum or other similar strong, lightweight and rigid material. The chassis is also preferably collapsible such that the chassis may be stowed and transported on or within a typical passenger automobile.

As shown in FIG. 1, the detachable buoyant device includes, but is not limited to, use of a kayak or a canoe 35. In this embodiment, the buoyant housing device 36 secures the body of the detachable buoyant device to the chassis by means of straps such that if the chassis and the buoyant device are placed in a body of water, the buoyant device floatably supports the entire vehicle.

Figure 3:
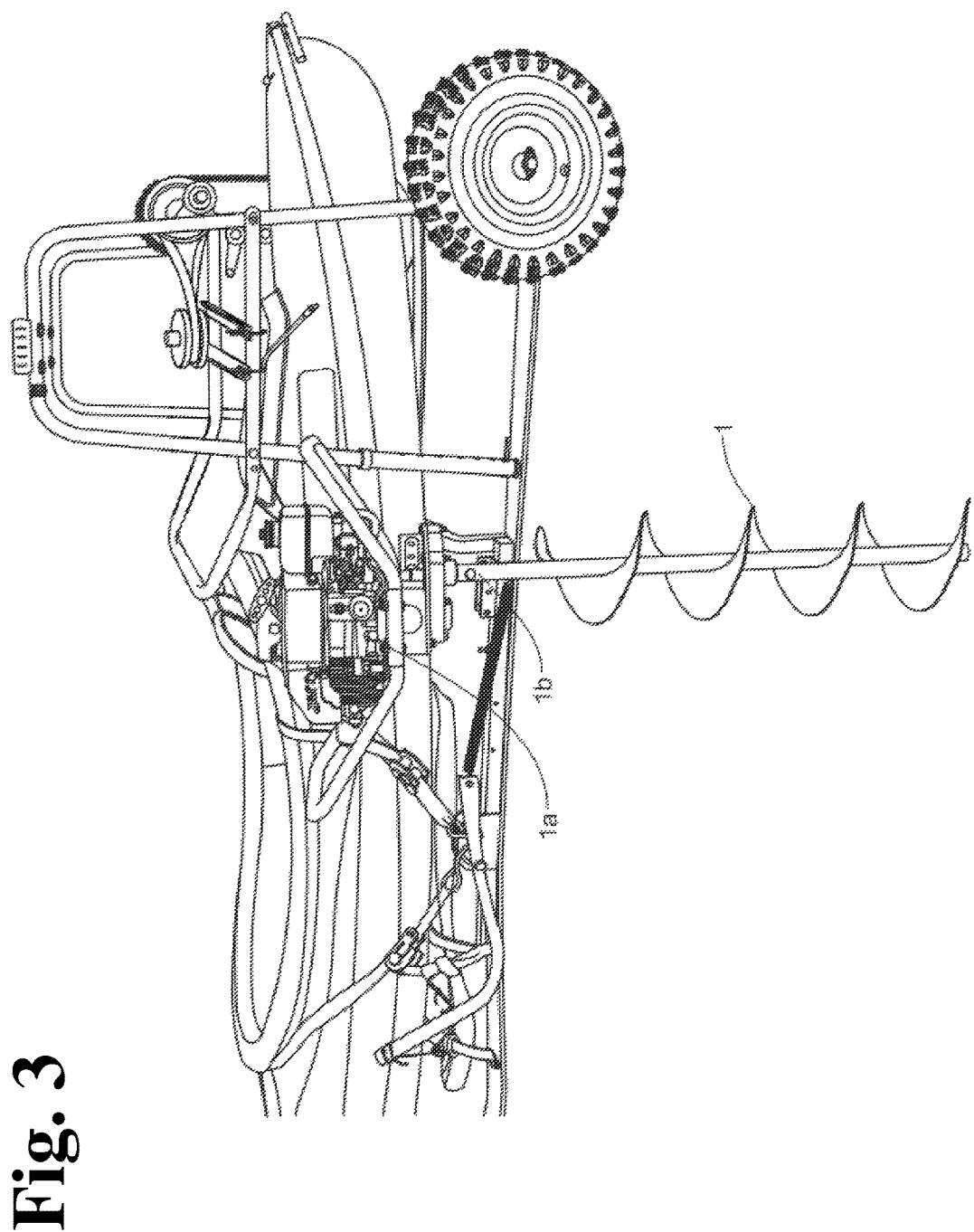
FIG. 3 illustrates one embodiment of the invention wherein the engine comprises an ice augur motor that is detachable from the collapsible chassis for use with an ice augur drill.
Figure 4:
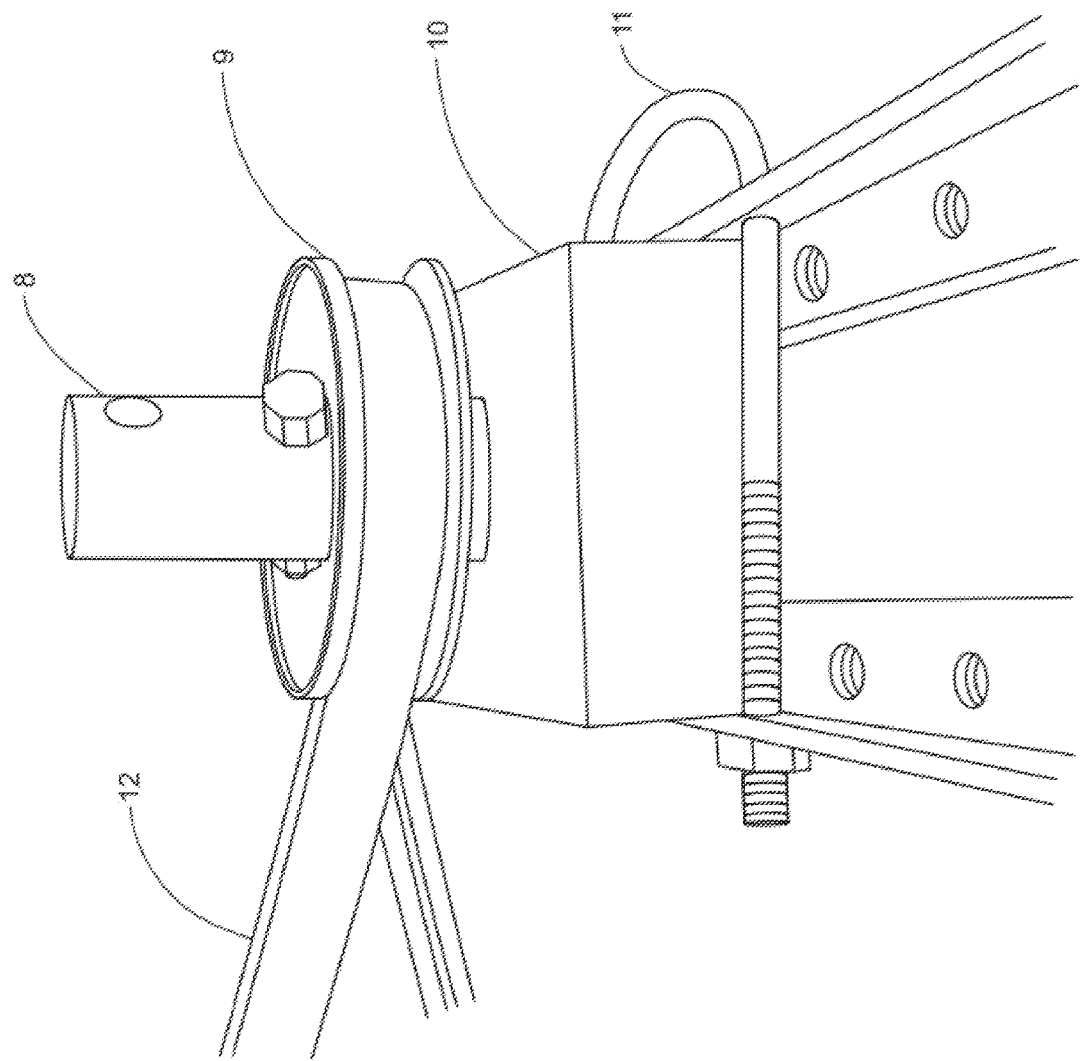
FIG. 4-7 illustrates one embodiment of the drive assembly for transferring power from the engine to the drive system.
Figure 5:
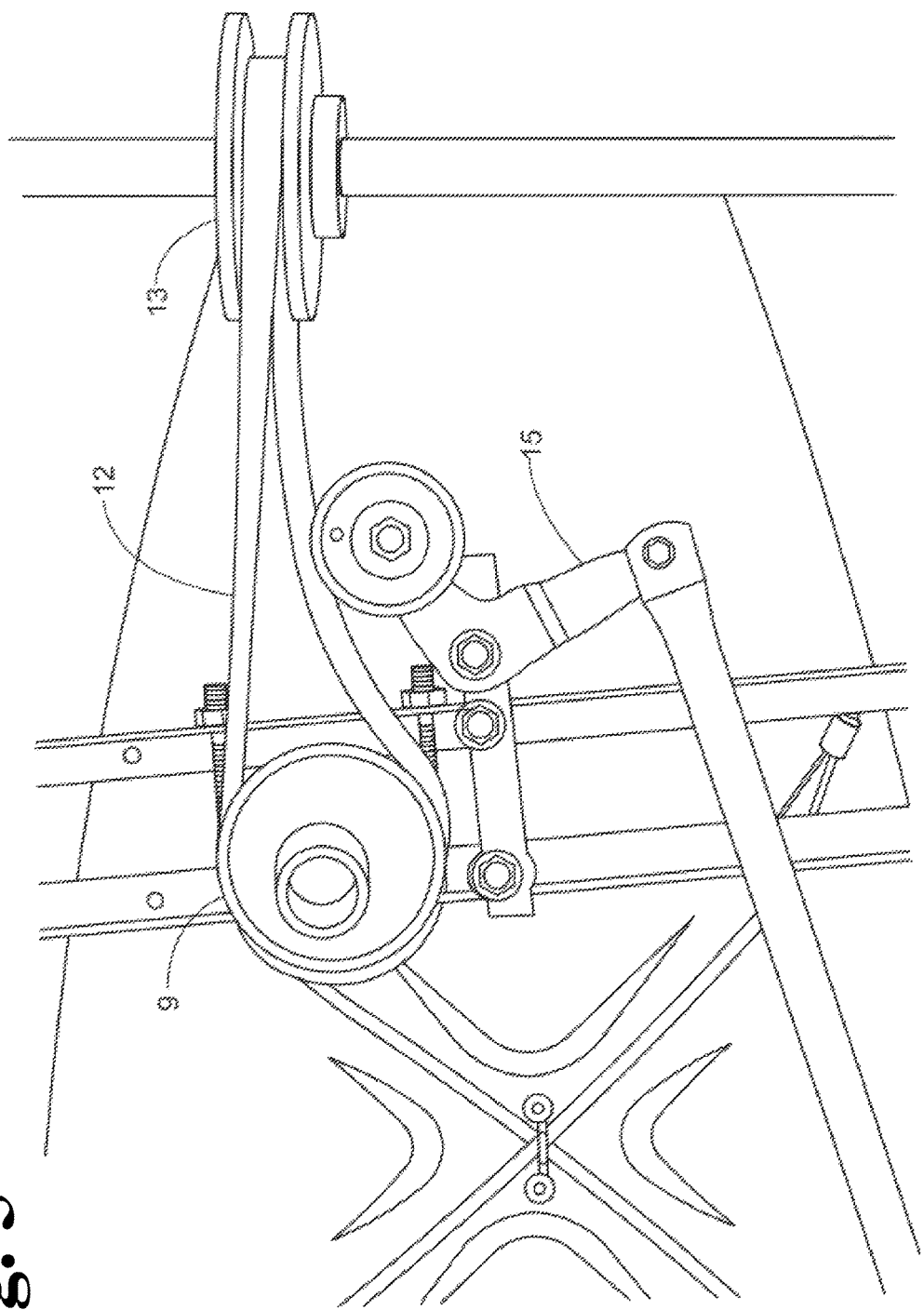
Figure 6:
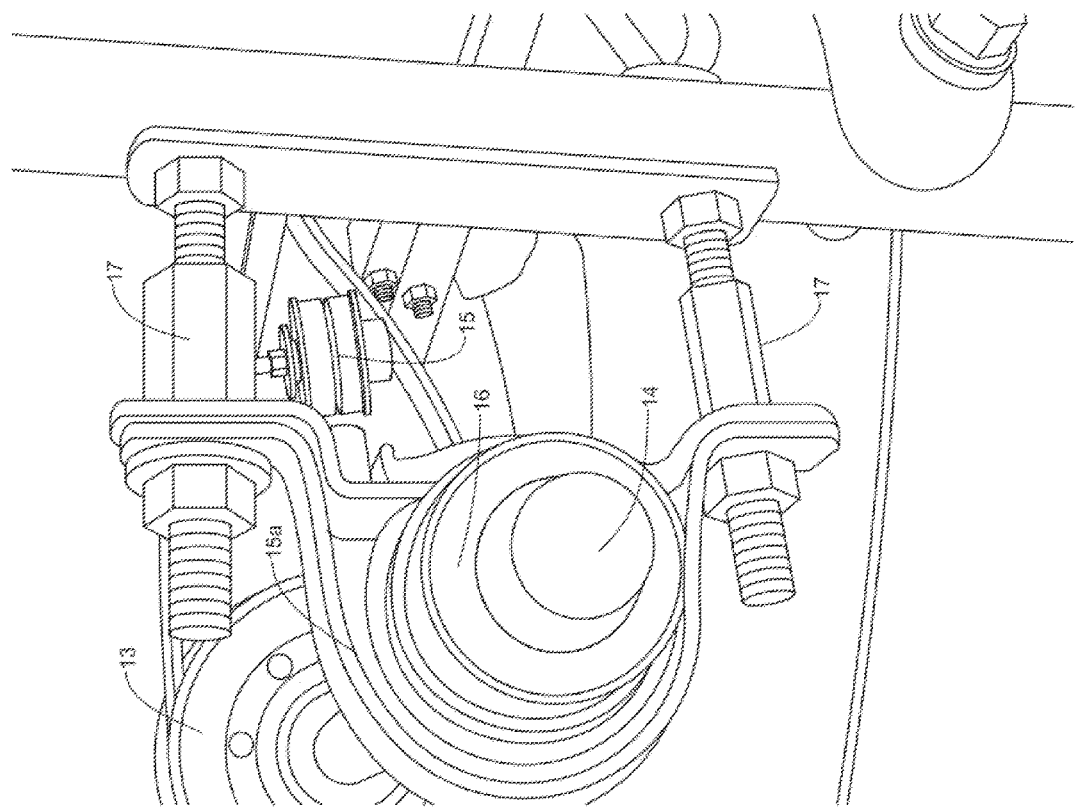
Figure 7:
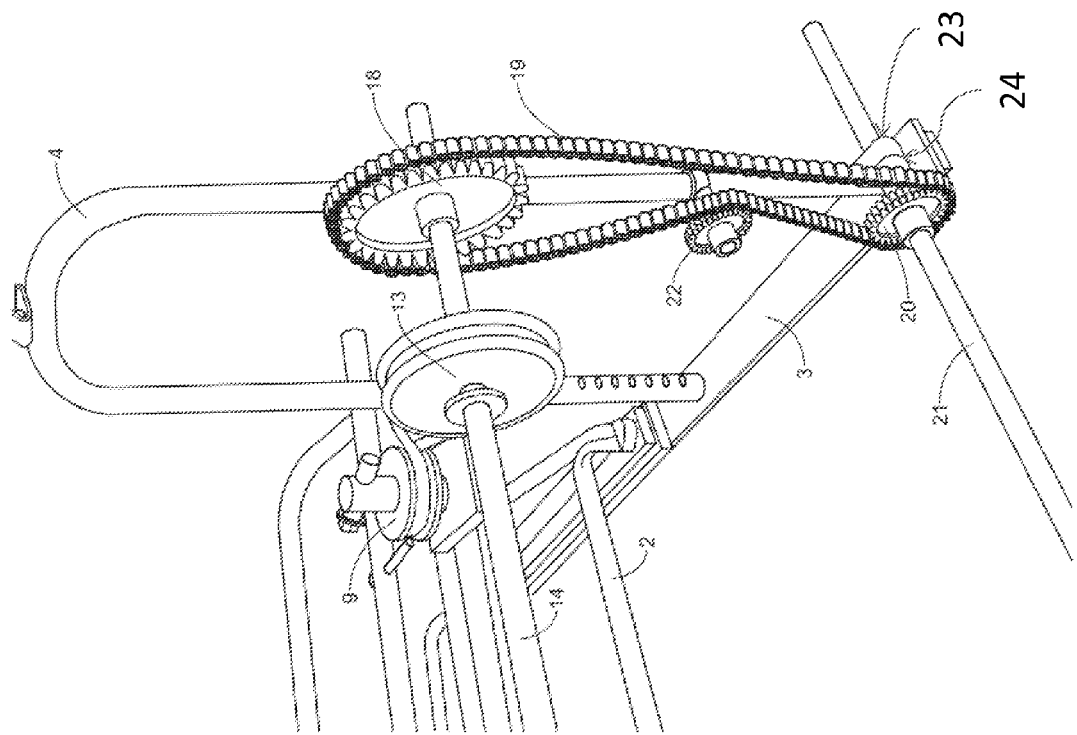
Figure 8:
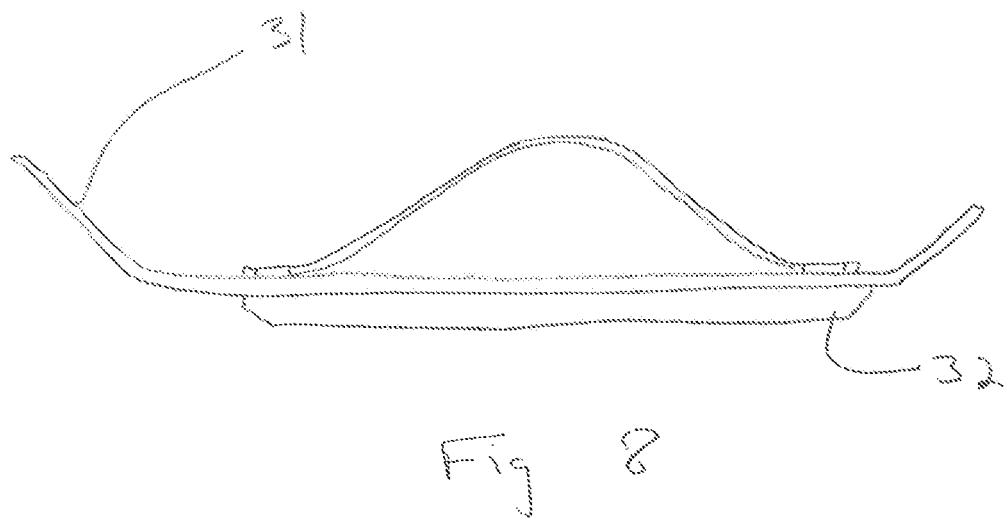
FIG. 8 is a side view of center steering ski and the skeg.
Figure 7:
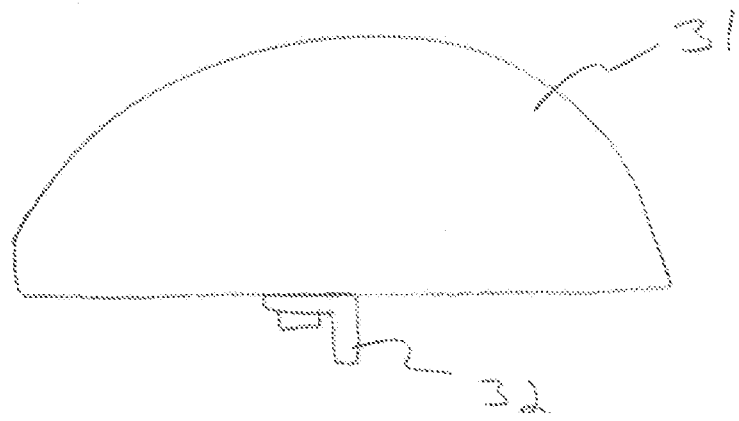

The detachable engine includes, but is not limited to, a gasoline or propane engine 1a. The engine preferably provides sufficient power to propel the vehicle forward when on a solid ground surface. As best seen in FIG. 3, one embodiment comprises a gasoline engine 1a that may be removed and used to power an ice auger. The embodiment places the engine on the top end of the chassis such that the drive shaft is oriented in a downward position. The engine is detachably secured to the chassis, such as by means of utilizing bracket mounts 7. Placing the engine at the top end of the chassis prevents contamination of the engine should the vehicle encounter water. In addition, the dual purpose nature of the engine for powering the vehicle and for powering an ice auger adds to convenience, particularly when the vehicle is used for traversing frozen bodies of water for the sport of ice fishing.

Furthermore, in one embodiment, the running gear selection comprises of 2 studded rear wheels 25. In this embodiment, the rear wheels are attached to the chassis by the drive axle 21. The studded rear wheels provide additional traction when driven on ice or snow. The wheels and drive axle are powered by the drive system assembly. This embodiment, seen in FIG. 2, also includes three skis: two fixed lateral skis 3 as a means of front support and for reduced friction on ice or snow, and a third center steering ski 31, used for steering the vehicle while traveling on ice or snow.

As best seen in FIG. 4-7, this embodiment comprises a drive system assembly that transfers power from the engine to the running gear selection. The drive system comprises a drive shaft sleeve 8, which the motors drive shaft inserts into. A fastening means holds the drive shaft in place, which in this embodiment is a locking pin 1b. The drive shaft attaches to a drive shaft sleeve 8 that in turn attaches to a primary draft belt pulley 9. The primary drive belt pulley 9 mounts on the sealed bearing assembly 10. The drive assembly makes use of a sealed bearing assembly 10 that allows for adjustment of the assembly on the horizontal axis. The drive belt 12 is connected to the primary drive belt pulley 9, and then twisted ninety degrees before being connected to a secondary belt pulley 13. In this embodiment, the twisted relationship is necessary because the axis of the primary drive belt pulley 9 and the axis of the secondary belt pulley 13 are disposed in a perpendicular relationship. The drive belt twists in either direction permitting use of different engines that rotates the drive shaft in either clockwise or counterclockwise direction. The secondary belt pulley 13 mounts to a jack shaft 14 to transition the engine's force from a torque along the horizontal axis to a torque on the vertical axis that can be applied to the axle and drive the wheels. Torque is transferred to the drive axle 21 by use of a primary drive sprocket 18 mounted on the jack shaft 14 that drives a chain 19 that in turn drives a secondary drive sprocket 20 mounted on the drive axle 21. Upon applying torque to the secondary drive sprocket, the secondary drive sprocket 20 in turn applies a torque to the drive axle 21 which turns the wheels and propels the vehicle forward.

Therefore, in this embodiment of the running gear selection and drive system assembly, when the engine is started, the drive shaft is rotated, causing the drive belt to turn and rotate the jack shaft 14. The jack shaft then turns the chain 19 rotating the drive axle 21 and turning the wheels, thereby propelling the vehicle forward.

In one embodiment, as seen in FIG. 1-2, a brake system for the vehicle comprises two elongated aluminum brake handles 27 with a handle on one end and a sharpened end opposite the handle end. The bars are fastened to the chassis and configured within reach of the vehicle operator. The operator slows the vehicle by pulling up on the handle causing the sharpened brake handle end 28 to grip the ground creating friction, thus slowing the vehicle.

In addition to being used for braking, handles 27 also can be used for steering. In one embodiment, as seen in FIG. 2, a steering system comprises a center steering ski 31 pivotally attached to the center of the chassis parallel to the longitudinal axis of the chassis. The center ski contains an aluminum skeg 32 along the bottom of the ski parallel to the longitudinal axis of the ski. In addition, the center ski is attached to two brake handles 27 by steering ski tensioning springs 33 and steering ski adjustment cables 34. Upon lifting either handle, the vehicle turns in the direction to the corresponding side the handle was lifted. Upon lifting the vehicle operator's right brake handle, the handle pulls the center steering ski to pivotally angle to the right, causing the vehicle to turn in the right direction. Upon lifting the left brake handle, the vehicle turns in the left direction. Furthermore, when both handles are lifted simultaneously, the sharpened brake handle ends contact the surface, thus slowing the vehicle.

In one embodiment, an internal combustion engine, a kayak and a drive system assembly comprising detachable studded wheels is detachably connected to a collapsible chassis.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A buoyant vehicle comprising:
   a chassis
   a running gear selection capable of being detachably connected to the chassis;
   an engine; the engine capable of being detachably connected to the chassis;
   an ice auger capable of being connected to the engine;
   a drive system assembly capable of being detachably connected to the engine and to the running gear; wherein the drive system assembly comprises a drive shaft capable of being detachably connected to the engine; and wherein the drive shaft is dimensioned and configured to drive the drive system; and
   a buoyant housing device, dimensioned and configured to house an associated buoyant device with sufficient buoyancy and space to support at least one associated passenger and the entire vehicle in a body of water, attached to said chassis.

2. The buoyant vehicle of claim 1, wherein the running gear selection comprises at least 1 wheel being detachably connected to a drive axle, the drive axle being detachably connected to the chassis.

3. The buoyant vehicle of claim 1, wherein the chassis further comprises
   a center steering ski; and
   one or more fixed lateral skis to traverse ice and snow ground conditions.

4. The buoyant vehicle of claim 3, wherein handle bars are attached to the center steering ski to permit vehicle steering;
   wherein the steering ski is pivotally attached to the chassis; and
   wherein the attached handle bars angularly position the center steering ski to turn the vehicle.

5. The buoyant vehicle of claim 3, wherein brake handle bars are pivotally attached to the chassis to permit vehicle braking;
   wherein the brake handle bars are elongated and have a distally sharpened axial extremity;
   wherein when a vehicle operator pulls the handle bars, the sharpened axial extremity contact the ground surface, thereby slowing and stopping the vehicle.

6. The buoyant vehicle of claim 1, wherein the engine is an internal combustion engine.

7. The buoyant vehicle of claim 4, wherein the handle bars are pivotally attached to the chassis to permit vehicle braking;
   wherein the handle bars are elongated and have a distally sharpened axial extremity;
   wherein when a vehicle operator pulls the handle bars, the sharpened axial extremity contact the ground surface, thereby slowing and stopping the vehicle.

8. The buoyant vehicle of claim 1, wherein the chassis is collapsible.

9. The buoyant vehicle of claim 1, wherein the buoyant device is a kayak.

10. The buoyant vehicle of claim 8, wherein the chassis may be stowed and transported on or within a passenger automobile when it is in a collapsed status.

11. A buoyant vehicle comprising:
   a chassis
   a running gear selection capable of being detachably connected to the chassis;
   an engine; the engine capable of being detachably connected to the chassis;
   an ice auger capable of being connected to the engine;
   a drive system assembly capable of being detachably connected to the engine and to the running gear; wherein the drive system assembly comprises a drive shaft capable of being detachably connected to the engine; and wherein the drive shaft is dimensioned and configured to drive the drive system; and
   a buoyant housing device capable of being detachably connected to an associated buoyant device with sufficient buoyancy and space to support at least one associated passenger and the entire vehicle in a body of water.

12. The buoyant vehicle of claim 11, wherein the running gear selection comprises at least 1 wheel being detachably connected to a drive axle, said drive axle being detachably connected to the chassis.

13. The buoyant vehicle of claim 11, wherein the chassis further comprises:
   a center steering ski; and
   one or more fixed lateral skis to traverse ice and snow ground conditions.

14. The buoyant vehicle of claim 13, wherein handle bars are attached to the center steering ski to permit vehicle steering;
   wherein the steering ski is pivotally attached to the chassis, and
   wherein the attached handle bars angularly position the center steering ski to turn the vehicle.

15. The buoyant vehicle of claim 13, wherein brake handle bars are pivotally attached to the chassis to permit vehicle braking;
   wherein the brake handle bars are elongated and have a distally sharpened axial extremity;
   wherein when a vehicle operator pulls the handle bars, the sharpened axial extremity contacts the ground surface, thereby slowing and stopping the vehicle.

16. The buoyant vehicle of claim 11, wherein the engine is an internal combustion engine.

17. The buoyant vehicle of claim 14, wherein the handle bars are pivotally attached to the chassis to permit vehicle braking;
   wherein the handle bars are elongated and have a distally sharpened axial extremity;
   wherein when a vehicle operator pulls the handle bars, the sharpened axial extremity contacts the ground surface, thereby slowing and stopping the vehicle.

18. The buoyant vehicle of claim 11, wherein the chassis is collapsible.

19. The buoyant vehicle of claim 11, wherein the buoyant device is a kayak.

20. The buoyant vehicle of claim 18, wherein the chassis may be stowed and transported on or within a passenger automobile when it is in a collapsed status.

* * * * *